United States Patent
Ahn

(10) Patent No.: US 9,315,668 B2
(45) Date of Patent: Apr. 19, 2016

(54) LIQUID CRYSTAL DISPLAY

(71) Applicant: Samsung Display Co., Ltd., Yongin, Gyeonggi-Do (KR)

(72) Inventor: Hyun Ku Ahn, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/331,739

(22) Filed: Jul. 15, 2014

(65) Prior Publication Data

US 2015/0205150 A1 Jul. 23, 2015

(30) Foreign Application Priority Data

Jan. 21, 2014 (KR) .................. 10-2014-0007275

(51) Int. Cl.
 *G02F 1/1337* (2006.01)
 *C08L 79/08* (2006.01)
 *C08G 73/10* (2006.01)

(52) U.S. Cl.
 CPC .................. *C08L 79/08* (2013.01); *C08G 73/10* (2013.01)

(58) Field of Classification Search
 CPC .................. C08L 79/08; C08G 73/10
 USPC .................. 349/123–136
 See application file for complete search history.

(56) References Cited

U.S. PATENT DOCUMENTS

| | | |
|---|---|---|
| 6,201,588 B1 | 3/2001 | Walton et al. |
| 7,105,209 B2 | 9/2006 | Heckmeier et al. |
| 8,362,151 B2 | 1/2013 | Li et al. |
| 8,409,674 B2 | 4/2013 | Harding et al. |
| 8,445,080 B2 | 5/2013 | Byun et al. |
| 8,487,069 B2 | 7/2013 | Yang et al. |
| 2008/0160222 A1 | 7/2008 | Harding et al. |
| 2012/0300162 A1 | 11/2012 | Uchino et al. |
| 2014/0111752 A1* | 4/2014 | Miyakawa ............ C08G 73/10 349/123 |

FOREIGN PATENT DOCUMENTS

| | | |
|---|---|---|
| JP | 2008-242445 A | 10/2008 |
| JP | 2013-068843 A | 4/2013 |

* cited by examiner

*Primary Examiner* — Charles Chang
(74) *Attorney, Agent, or Firm* — Cantor Colburn LLP

(57) ABSTRACT

A liquid crystal display includes: a first insulation substrate; a second insulation substrate facing the first insulation substrate; a pixel electrode provided on the first insulation substrate; a common electrode provided on the first insulation substrate or the second insulation substrate; an alignment layer member including a first alignment layer and a second alignment layer provided on the first insulation substrate and the second insulation substrate, respectively; and a liquid crystal layer provided between the first insulation substrate and the second insulation substrate, wherein at least one of the first alignment layer and the second alignment layer includes a main chain and a plurality of side chains connected to the main chain, and the side chain includes a reactive mesogen (RM) including a functional group for increasing rigidity of the alignment layer.

18 Claims, 10 Drawing Sheets

Formula 3

Formula 4

Formula 5

Formula 6

LIQUID CRYSTAL DISPLAY

This application claims priority to Korean Patent Application No. 10-2014-0007275 filed on Jan. 21, 2014, and all the benefits accruing therefrom under 35 U.S.C. §119, the content of which in its entirety is herein incorporated by reference.

BACKGROUND (a) Field

The present invention relates to a liquid crystal display.

(b) Description of the Related Art

A liquid crystal display is a flat panel display which is widely used, and includes two sheets of display panels in which field generating electrodes such as a pixel electrode and a common electrode are formed, and a liquid crystal layer interposed therebetween. The liquid crystal display displays an image by applying a voltage to the field generating electrodes to generate an electric field in the liquid crystal layer, thereby determining an orientation of liquid crystal molecules of the liquid crystal layer and controlling polarization of incident light.

Among the liquid crystal displays, a liquid crystal display in a vertically aligned mode in which major axes of the liquid crystal molecules are aligned to be perpendicular to the upper and lower display panels when an electric field is not applied to the liquid crystal layer has a high contrast ratio and a wide reference viewing angle.

In order to implement a wide viewing angle in the liquid crystal display in the vertically aligned mode, a plurality of domains having different alignment directions of the liquid crystals may be formed in one pixel. As a method of forming the plurality of domains, a method of forming cutouts such as fine slits in a field generation electrode, a method of forming protrusions on the field generating electrode, etc., are used. These methods may form the plurality of domains by aligning the liquid crystal in a direction perpendicular to a fringe field by a fringe field formed between an edge of the cutout or the protrusion and the field generating electrode facing the edge.

The liquid crystal display in the vertically aligned mode may have degraded side visibility compared to front visibility. Methods of dividing the one pixel into two subpixels and making voltages of the two subpixels different have therefore been proposed.

Meanwhile, in order to increase response speed of the liquid crystal while implementing the wide viewing angle, a method of allowing a liquid crystal to have a pretilt in a state in which the electric field is not applied has been developed.

SUMMARY

The present invention has been made in an effort to provide a display device for improving the properties of an alignment layer.

An exemplary embodiment provides a liquid crystal display including: a first insulation substrate; a second insulation substrate facing the first insulation substrate; a pixel electrode disposed on the first insulation substrate; a common electrode disposed on the first insulation substrate or the second insulation substrate; an alignment layer including a first alignment layer disposed on the first insulation substrate and a second alignment layer disposed on the second insulation substrate; and a liquid crystal layer disposed between the first insulation substrate and the second insulation substrate, wherein at least one of the first alignment layer and the second alignment layer includes an alignment layer polymer including a main chain and a plurality of side chains connected to the main chain, and the plurality of side chains includes a reactive mesogen ("RM") including a functional group for increasing rigidity of the alignment layer.

In an exemplary embodiment, the alignment layer polymer includes polyamic acid or a polyimide.

In an exemplary embodiment, the polyamic acid or the polyimide is a copolymer of a dianhydride compound and a diamine compound unit body.

In an exemplary embodiment, the plurality of side chains are connected to the diamine compound unit body and the reactive mesogen includes a vertical functional group and a photoreactive group connected to the vertical functional group.

In an exemplary embodiment, the vertical functional group includes a compound represented by Formula 1:

(Formula 1)

In an exemplary embodiment, the photoreactive group includes a compound represented by Formula 2:

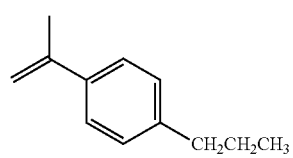

(Formula 2)

In an exemplary embodiment, the plurality of side chains includes a plurality of reactive mesogen molecules.

In an exemplary embodiment, rigidity of the alignment layer is increased as a number of side chains in the plurality of side chains is increased.

In an exemplary embodiment, the amount of diamine compound unit body including the reactive mesogen is less than 60 weight percent (wt %) of a total amount of the diamine compound unit body in the alignment layer polymer.

In an exemplary embodiment, the alignment layer polymer is configured to be crosslinked by irradiation with ultraviolet rays. When the irradiation of the ultraviolet rays is due to an electric field process, a voltage of substantially 3 volts (V) to 60 V is applied.

In an exemplary embodiment, the common electrode is disposed on the second insulation substrate, and the pixel electrode includes a first subpixel electrode and a second subpixel electrode including a cross-shaped stem and a plurality of minute branches extended from the cross-shaped stem.

In an exemplary embodiment, the pixel electrode is divided into four subregions by the cross-shaped stem.

In an exemplary embodiment, the minute branches of each subregion are extended in different directions.

In another exemplary embodiment, neighboring minute branches are orthogonal to each other.

In yet another exemplary embodiment, a width of the minute branch is about 2.5 micrometers (μm) to about 5.0 μm.

In an exemplary embodiment, the diamine compound unit body a compound represented by at least one of Formulas 3 to 6:

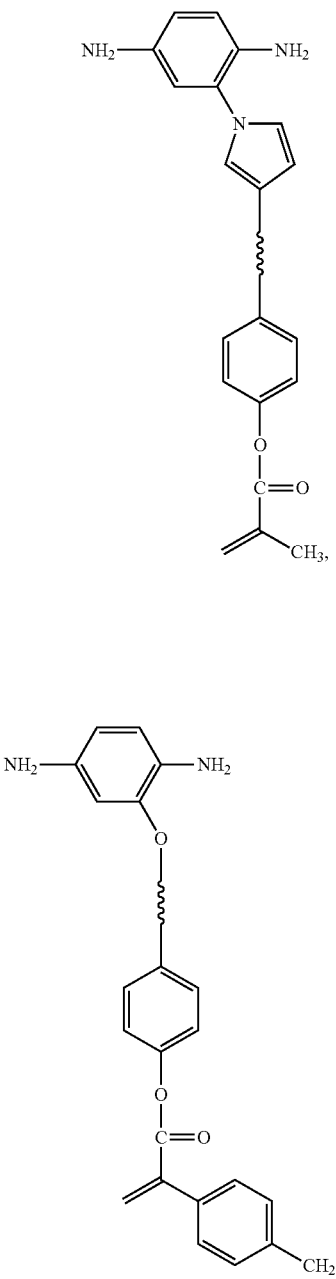

(Formula 3)

(Formula 4)

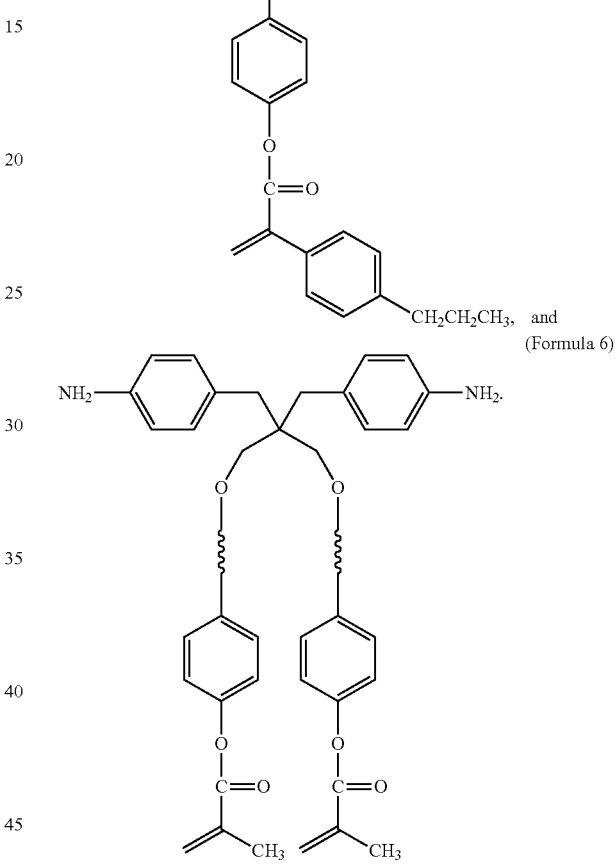

(Formula 5)

(Formula 6)

Another exemplary embodiment provides a method for manufacturing a liquid crystal display, including: coating an alignment layer polymer on a first insulation substrate and a second insulation substrate; applying a voltage to a pixel electrode disposed on the first insulation substrate and a common electrode disposed on the second insulation substrate; and irradiating the alignment layer polymer with ultraviolet rays.

In an exemplary embodiment, the irradiation of ultraviolet rays is an electric field process or a non-electric field process.

In another exemplary embodiment, the irradiation of ultraviolet rays is the electric field process, and a voltage of about 3 V to about 60 V is applied.

As set forth above, in exemplary embodiments according to the present invention, it is possible to provide a display device having improved mechanical properties and an improved afterimage of the alignment layer by using an alignment layer polymer including the disclosed reactive mesogen having increased rigidity.

DETAILED DESCRIPTION

Figure 1A:
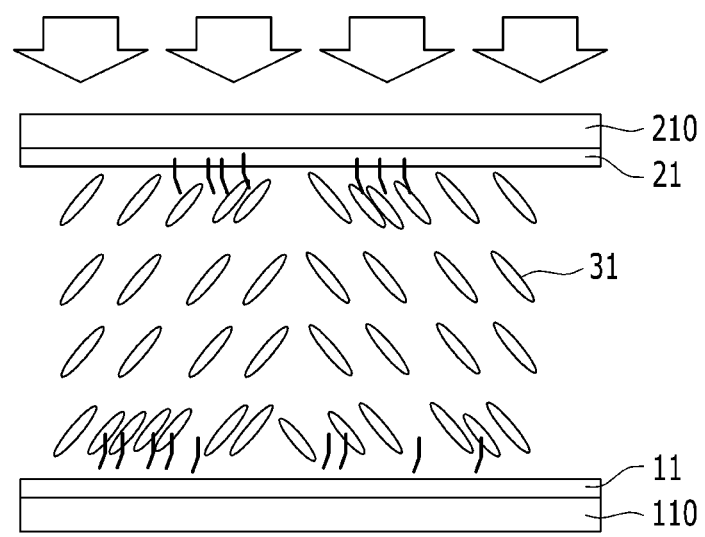
FIG. 1A is a diagram illustrating a process of allowing liquid crystal molecules to have pretilts by using an exemplary alignment layer including a photoreactive group.

The present invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In order to increase response speed of the liquid crystals while implementing the wide viewing angle, methods of allowing a liquid crystal to have a pretilt in a state in which the electric field is not applied have been developed. To allow the liquid crystals to have the pretilts in several directions, an alignment layer having several alignment directions is used, or a reactive mesogen is added to the alignment layer or the liquid crystal layer and then light is irradiated to the alignment layer or the liquid crystal layer in the state in which the electric field is applied thereto, thereby forming the pretilt.

A method for orienting liquid crystal molecules 31 to allow them to have a pretilt will be described with reference to FIG. 1A, FIG. 1B, and FIG. 3 to FIG. 6.

Figure 1B:
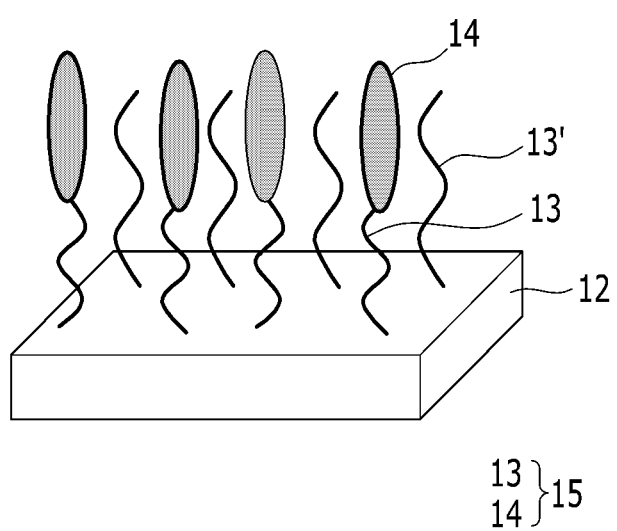
FIG. 1B is a schematic view of the exemplary alignment layer.

FIG. 1A is a diagram illustrating a process of allowing liquid crystal molecules to have pretilts by using an alignment layer including a light reactive (i.e. photoreactive) group capable of reacting with ultraviolet rays, and FIG. 1B is a schematic view of an exemplary embodiment of the alignment layer.

An alignment layer polymer including an alignment material is coated on substrates 110 and 210.

The alignment layer polymer may be formed by polymerization of a dianhydride compound and a diamine compound. In an exemplary embodiment, the alignment layer polymer formed by the polymerization may include a polyimide or polyamic acid.

The alignment layer polymer may include a main chain 12 and a plurality of side chains connected to the main chain 12. The plurality of side chains may include a reactive mesogen 15 including a photoreactive group 14 and a vertical functional group 13, a vertical functional group 13', or a combination thereof.

Figure 5:
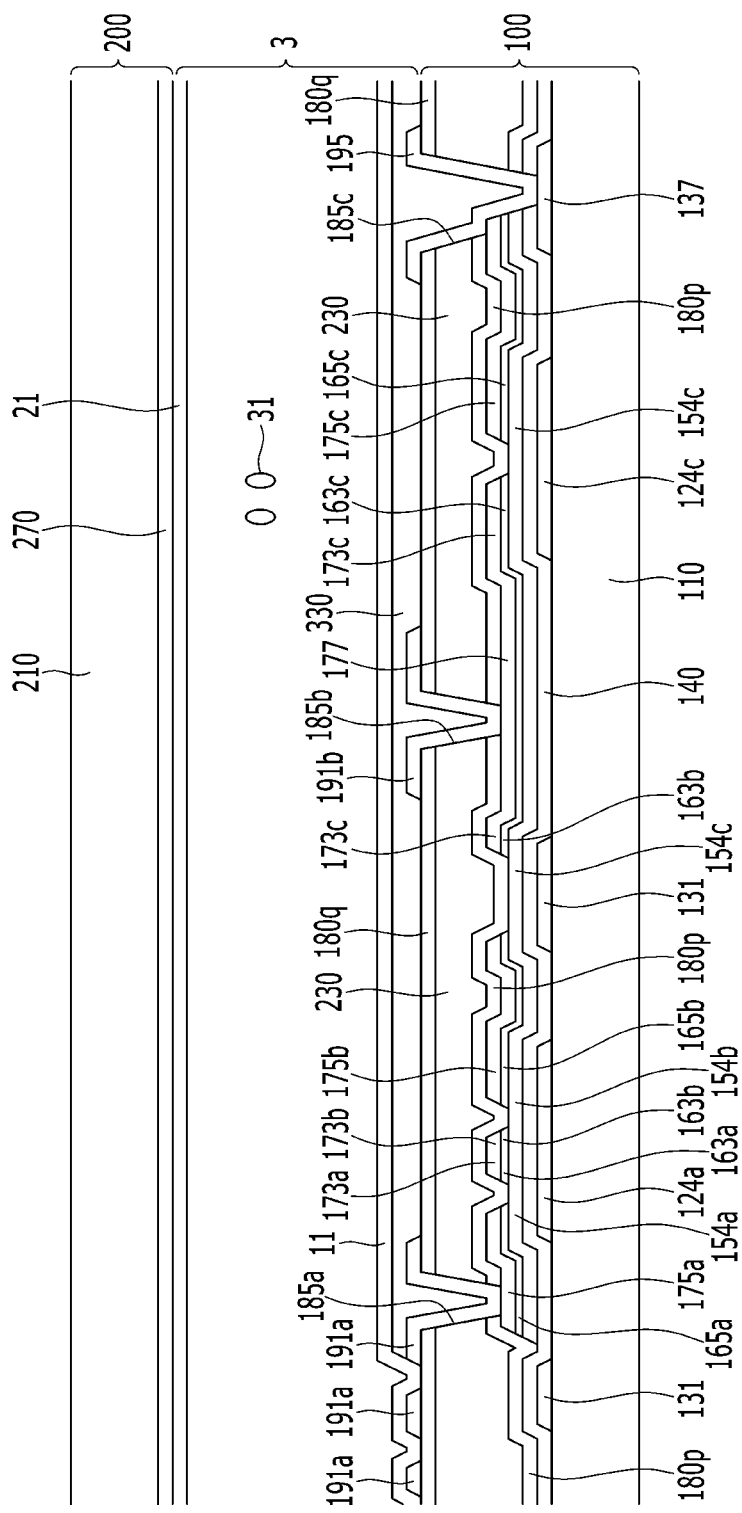
FIG. 5 is a cross-sectional view of the liquid crystal display taken along a line V-V of FIG. 4.

As shown in FIG. 5, a data voltage is applied to a first subpixel electrode 191a and a second subpixel electrode 191b, and a common voltage is applied to a common electrode 270 of an upper display panel 200 to generate an electric field in a liquid crystal layer 3 between the two display panels 100 and 200. Liquid crystal molecules 31 of the liquid crystal layer 3 may be tilted in directions parallel to the length direction of minute branch parts 194a, 194b, 194c, and 194d in response to the electric field. In this instance, in one pixel the liquid crystal molecules 31 may be tilted in a total of four different directions.

When the electric field is generated in the liquid crystal layer 3 and light such as ultraviolet rays is irradiated on the liquid crystal layer 3, photoreactive groups 14 included in the reactive mesogen 15 react with each other to form a cross-linking portion (not shown). The cross-linking portion may have a pretilt.

That is, alignment layers 11 and 21 including the photoreactive group 14 have a pretilt due to the presence of the reactive mesogen 15. As a result, when a voltage is applied to field generating electrodes 191 and 270, the liquid crystal molecules 31 may be aligned while having the pretilt.

The reactive mesogen 15 may include the vertical functional group 13 and the photoreactive group 14. In particular, one or more reactive mesogen 15 may be connected to a single diamine compound unit body. The vertical functional group 13 may include a functional group for increasing rigidity. The photoreactive group 14 may include a functional group for increasing the coupling force between the reactive mesogens 15. Rigidity of the alignment layer polymer is improved by the above-noted reactive mesogen 15, thereby reducing the afterimage generated due to the weakness in rigidity of the alignment layer polymer.

The alignment layers 11 and 21 are described in detail below with reference to FIG. 2A and FIG. 2B.

The alignment layers 11 and 21 include an alignment layer polymer. The alignment layer polymer is a high-molecular weight polymer polymerized from a dianhydride and a diamine compound unit body. In an exemplary embodiment, the alignment layer polymer may include polyamic acid, a polyimide or a combination thereof.

The diamine compound unit body may include a diamine compound and a reactive mesogen, a vertical functional group or a combination thereof. In this instance, the diamine compound unit body including the reactive mesogen may be less than 60 wt % of the entire content of the diamine compound included in the alignment layer polymer. That is, since the diamine compound unit body includes the reactive mesogen and/or the vertical functional group, the diamine compound including the reactive mesogen may include the reactive mesogen or may include the entire diamine compound including the vertical functional group at less than 60 wt %.

The alignment layers 11 and 21 may include an alignment layer polymer having a main chain and a plurality of side chains connected to the main chain. The side chain may include a vertical functional group 13' or may include the reactive mesogen 15 including the photoreactive group 14 connected to the vertical functional group 13.

The reactive mesogen 15 includes the vertical functional group 13 connected to the main chain of the alignment layer polymer and the photoreactive group 14 connected to the vertical functional group 13. The photoreactive groups 14 are crosslinked by irradiation with ultraviolet rays to form a combiner (not shown) for indicating a pretilt. In detail, when irradiated with ultraviolet rays, the diamine compound unit body including the reactive mesogen 15 is polymerized (e.g. crosslinked) with a photoreactive group 14 of another diamine compound unit body to form a combiner (not shown) which maintains the liquid crystal molecules 31 in a pretilted state.

Irradiation with ultraviolet rays to form the combiner of the alignment layer, may be an electric field process or a non-electric field process. In detail, the electric field process for irradiating ultraviolet rays occurs when there is a voltage difference between the common electrode 270 and the pixel electrode 191, and the non-electric field process for irradiating ultraviolet rays occurs with greater energy while no voltage is applied. Further, for example, when irradiation of ultraviolet rays is the electric field process, a voltage of substantially 3 to 60 Volts (V) may be applied.

Exemplary embodiments of the diamine compound unit body including the reactive mesogen may be as shown in FIG. 2A to FIG. 2D, but it is not restricted thereto. FIG. 2A to FIG. 2D will now be described in detail.

Figure 2A:
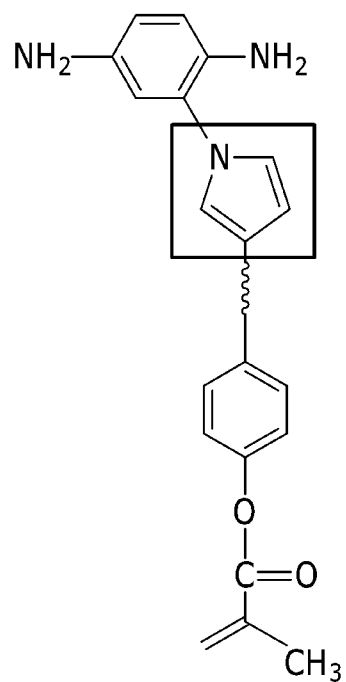
FIG. 2A to FIG. 2D show formulas of an exemplary diamine compound unit body according to the present invention.

Referring to FIG. 2A, the diamine compound unit body includes a compound represented by Formula 1. In particular, the compound of Formula 1 may be a component of the vertical functional group of the reactive mesogen.

(Formula 1)

The compound expressed by Formula 1 may improve rigidity of the vertical functional group. An example thereof is the diamine compound unit body shown in FIG. 2A, and without being restricted to this, any compounds including the compound expressed with Formula 1 are allowable for the vertical functional group.

Figure 2B:
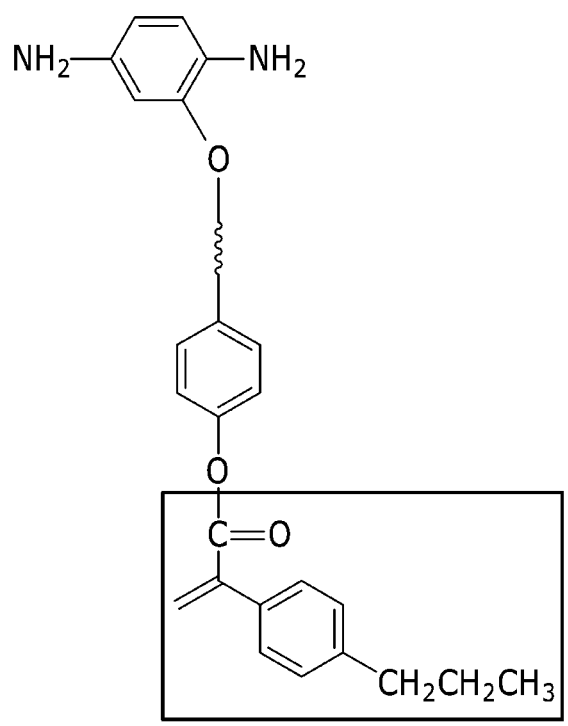

Referring to FIG. 2B, the diamine compound unit body including the reactive mesogen may include a compound represented by Formula 2. In an exemplary embodiment, the photoreactive group may include the compound expressed in Formula 2.

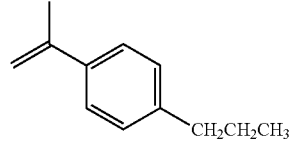

(Formula 2)

The compound expressed in Formula 2 is a photoreactive group and includes a multiple bonding region in which a combination with another photoreactive group may be performed. The photoreactive group including the compound expressed in Formula 2 improves anchoring energy by hydrogen bonding thereby reducing an afterimage caused by bending of the photoreactive group or the vertical functional group.

in an exemplary embodiment, the diamine compound unit body expressed in FIG. 2B may be provided, and without being restricted to this, any compound including the compound expressed in Formula 2 in the photoreactive group may be possible.

Figure 2C:
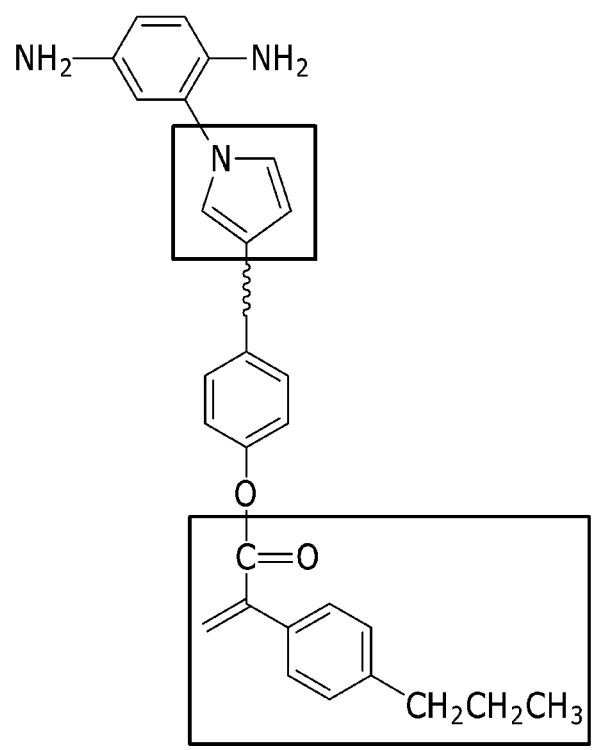

Referring to FIG. 2C, the reactive mesogen may include the compound expressed in Formula 1 and the compound expressed in Formula 2. Accordingly, as shown in FIG. 2C, the vertical functional group may include the compound expressed in Formula 1, and the photoreactive group may include the compound expressed in Formula 2.

in an exemplary embodiment, the diamine compound unit body expressed in FIG. 2C may be provided, and without being restricted to this, any compounds including the compound expressed in Formula 1 in the vertical functional group and including the compound expressed in Formula 2 in the photoreactive group may be possible.

The diamine compound unit body including the compound expressed as Formulas 1 and 2 may improve rigidity of the vertical functional group and may also improve anchoring energy caused by bonding with other molecules. This generates improvement of a property of the alignment layer and thereby reduces the afterimage of the liquid crystal display.

Figure 2D:
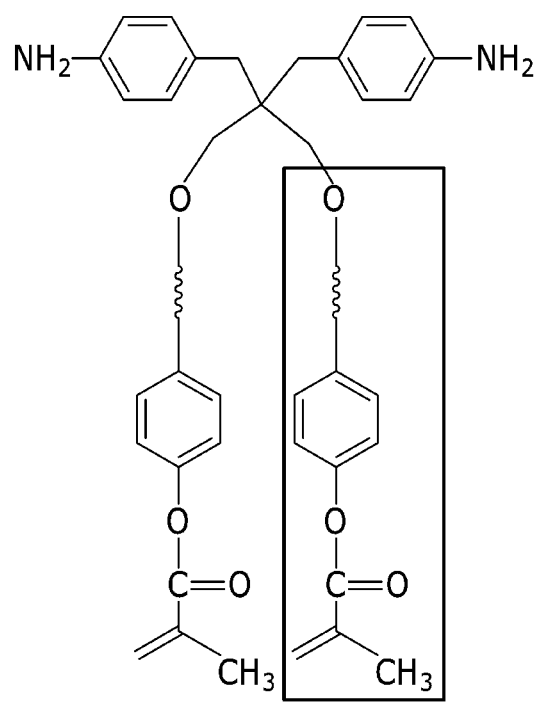

Referring to FIG. 2D, a single diamine compound unit body may include at least two reactive mesogen molecules. In exemplary embodiment, there are two molecules of reactive mesogen included by the single diamine compound unit body, and without being restricted to this, a plurality of the reactive mesogen may be included. Further, in an exemplary embodiment, a single diamine compound unit body includes two molecules of reactive mesogen irrespective of the functional group, and without being restricted to this, it is also possible to use the diamine compound unit body including a plurality of the reactive mesogen molecules shown in FIG. 2A to FIG. 2C.

As shown in FIG. 2D, the single diamine compound unit body may include two molecules of reactive mesogen connected thereto. The two molecules of reactive mesogen include a vertical functional group and a photoreactive group, and each vertical functional group is connected to a main chain of the alignment layer polymer and each photoreactive group is independently connected to the vertical functional group.

When the alignment layer including the above-structured diamine compound unit body is polymerized, the content of the reactive mesogen is increased and the inter-molecule bonding may be increased. Rigidity of the alignment layer is improved according to the increase of the bonding, and as a result, the afterimage occurring in the display device may be improved.

In an exemplary embodiment, the alignment layer is not restricted to the compounds shown in FIG. 2A to FIG. 2D. The vertical functional group may include a functional group having rigidity or may include a photoreactive group having great anchoring energy, and a single diamine unit body may include a plurality of different reactive mesogen molecules, thereby allowing various kinds of combinations. The above-featured alignment layer improves rigidity to thus improve the afterimage.

Figure 3:
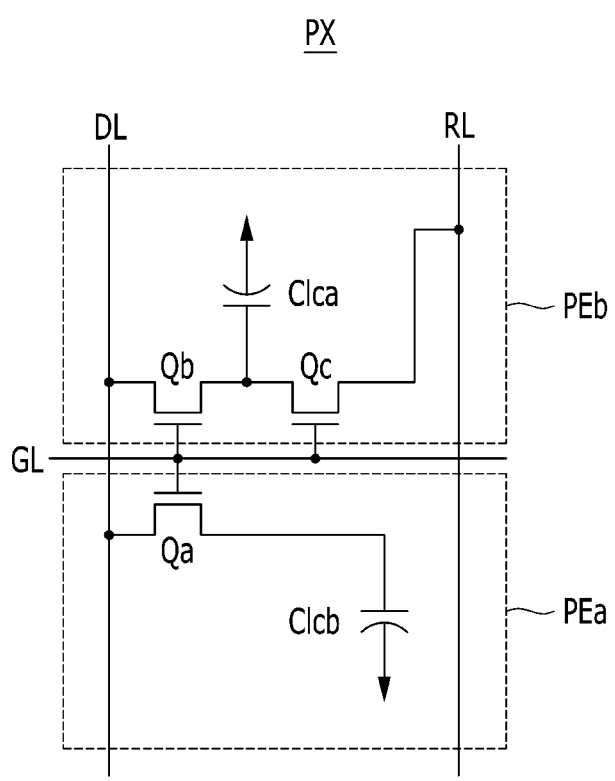
FIG. 3 is a circuit diagram of one pixel of an exemplary liquid crystal display according to the present invention.

In an exemplary embodiment, disposal of a signal line, a pixel of a liquid crystal display and a driving method thereof will now be described with reference to FIG. 3. FIG. 3 shows a circuit diagram of a pixel of an exemplary liquid crystal display.

Referring to FIG. 3, in an exemplary embodiment, a pixel PX of the liquid crystal display includes a plurality of signal lines including a gate line GL for transmitting a gate signal, a data line DL for transmitting a data signal, and a divided-voltage reference voltage line RL for transmitting a divided-voltage reference voltage, first, second and third switching elements Qa, Qb, Qc connected to the plurality of signal lines, and first and second liquid crystal capacitors Clca, Clcb.

The first and second switching elements Qa, Qb are connected to the gate line GL and the data line DL, respectively, and the third switching element Qc is connected to an output terminal of the second switching element Qb and the divided-voltage reference voltage line RL.

The first switching element Qa and the second switching element Qb are three-terminal elements such as a thin film transistor, in which a control terminal thereof is connected to the gate line GL, an input terminal thereof is connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal element like the thin film transistor, in which a control terminal thereof is connected to the gate line (GL, an input terminal thereof is connected to the second liquid crystal capacitor Clcb, and an output terminal thereof is connected to the divided-voltage reference voltage line RL.

When a gate-on signal is applied to the gate line GL, the first switching element Qa, the second switching element Qb, and the third switching element Qc connected thereto are turned on. The data voltage applied through the data line DL is applied to a first subpixel electrode PEa and a second subpixel electrode PEb through the turned on first switching element Qa and second switching element Qb. In this instance, the data voltages applied to the first subpixel electrode PEa and the second subpixel electrode PEb are the same, and the first liquid crystal capacitor Clca and the second liquid crystal capacitor Clcb are charged with the same value by the difference between the common voltage and the data voltage. Simultaneously, the voltage charged in the second liquid crystal capacitor Clcb is divided by the turned on third switching element Qc. The voltage value charged in the second liquid crystal capacitor Clcb is reduced by the difference between the common voltage and the divided-voltage reference voltage. That is, the voltage charged in the first liquid crystal capacitor Clca becomes greater than the voltage charged in the second liquid crystal capacitor Clcb.

As described, the voltage charged in the first liquid crystal capacitor Clca becomes different from the voltage charged in the second liquid crystal capacitor Clcb. Since the voltage of the first liquid crystal capacitor Clca is different from the voltage of the second liquid crystal capacitor Clcb, angles of the inclined liquid crystal molecules are different in the first subpixel and the second subpixel, and luminance of the two subpixels becomes different. Therefore, when the voltage of the first liquid crystal capacitor Clca and the voltage of the second liquid crystal capacitor Clcb are appropriately controlled, the image viewed from the lateral side may be close to the image viewed from the front as much as possible and lateral visibility may be improved.

The illustrated exemplary embodiment has included the second liquid crystal capacitor Clcb and the third switching element Qc connected to the divided-voltage reference voltage line RL so as to make the voltage charged in the first liquid crystal capacitor Clca be different from the voltage charged in the second liquid crystal capacitor Clcb. In another exemplary embodiment, the liquid crystal display may connect the second liquid crystal capacitor Clcb to a step-down capacitor.

In detail, in one exemplary embodiment, the liquid crystal display may include a third switching element including a first terminal connected to the step-down gate line, a second terminal connected to the second liquid crystal capacitor Clcb, and a third terminal connected to the step-down capacitor, and it charges a part of the charges stored in the second liquid crystal capacitor Clcb into the step-down capacitor to make a different charging voltage between the first liquid crystal capacitor Clca and the second liquid crystal capacitor Clcb. Further, the first liquid crystal capacitor Clca and the second liquid crystal capacitor Clcb are connected to different data lines and receive different data voltages so that the charged voltage between the first liquid crystal capacitor Clca and the second liquid crystal capacitor Clcb may be differently set. In addition, the charged voltage between the first liquid crystal capacitor Clca and the second liquid crystal capacitor Clcb may be differently set using various other methods.

Figure 4:
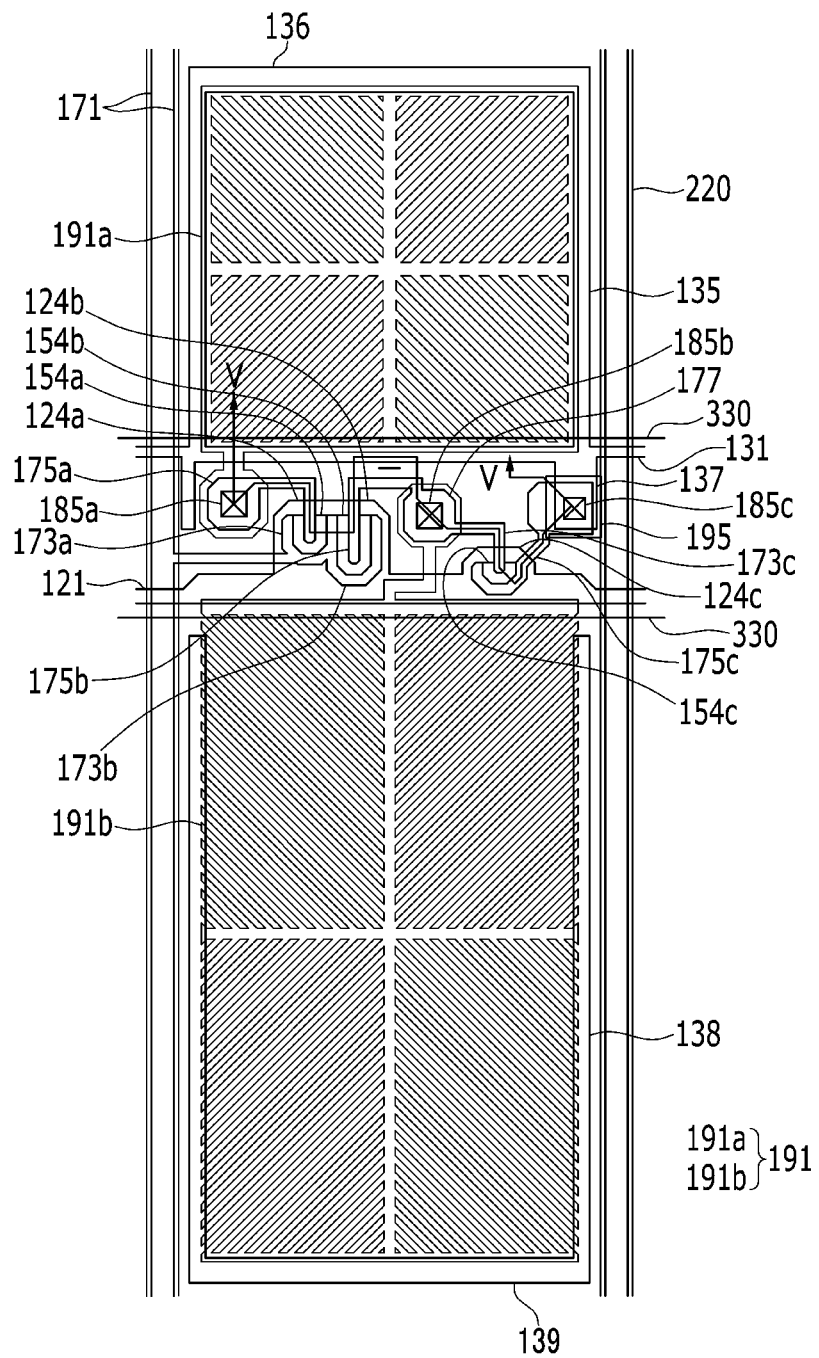
FIG. 4 is a plan view of a pixel in an exemplary liquid crystal display according to the present invention.
Figure 6:
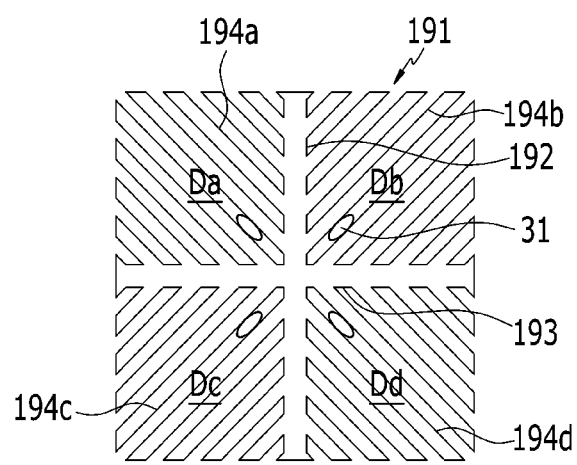
FIG. 6 is a diagram illustrating a basic structure of the pixel illustrated in FIG. 4.

Referring to FIG. 4 to FIG. 6, a configuration of a liquid crystal display according to an exemplary embodiment shown in FIG. 3 will now be described. FIG. 4 shows a plan view of a pixel of an exemplary liquid crystal display, and FIG. 5 shows a cross-sectional view with respect to line V-V of FIG. 4. FIG. 6 shows a top plan view of a basic region of the pixel electrode of a liquid crystal display illustrated in FIG. 4.

Referring to FIG. 4 and FIG. 5, the exemplary liquid crystal display includes a lower panel 100 and an upper panel 200 facing each other, a liquid crystal layer 3 provided between the display panels 100 and 200, and a pair of polarizers (not shown) attached to external sides of the display panels 100 and 200.

The lower panel 100 will now be described.

A gate conductor including a gate line 121 and a divided-voltage reference voltage line 131 is formed on the insulation substrate 110 made of transparent glass or plastic.

The gate line 121 includes a first gate electrode 124a, a second gate electrode 124b, a third gate electrode 124c, and a wide end portion (not shown) for an access to another layer or an external driving circuit.

The divided-voltage reference voltage line 131 includes first storage electrodes 135 and 136 and a reference electrode 137. Although not connected to the divided-voltage reference voltage line 131, second storage electrodes 138 and 139 overlapping the second subpixel electrode 191b are provided.

A gate insulating layer 140 is provided on the gate line 121 and the divided-voltage reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A data conductor including a plurality of data lines 171 including a first source electrode 173a, a second source electrode 173b, a first drain electrode 175a, a second drain electrode 175b, a third source electrode 173c, and a third drain electrode 175c, is formed on the ohmic contacts 163a, 165a, 163b, 165b, 163c, and 165c and the gate insulating layer 140.

The data conductor, and the semiconductor and the ohmic contacts provided below the data conductor, may be simultaneously formed by using a mask.

The data line 171 includes a wide end portion (not shown) for access to another layer or an external driving circuit.

The first gate electrode 124a, the first source electrode 173a, and the first drain electrode 175a form a first thin film transistor ("TFT") Qa together with the first semiconductor 154a, and a channel of the thin film transistor is formed on the first semiconductor 154a between the first source electrode 173a and the first drain electrode 175a. Similarly, the second gate electrode 124b, the second source electrode 173b, and the second drain electrode 175b form one second thin film transistor Qb along with the second semiconductor 154b, and a channel is formed on the second semiconductor 154b between the second source electrode 173b and the second drain electrode 175b. The third gate electrode 124c, the third source electrode 173c, and the third drain electrode 175c form one third thin film transistor Qc along with the third semiconductor 154c, and a channel is formed on the third semiconductor 154c between the third source electrode 173c and the third drain electrode 175c.

The second drain electrode 175b is connected to the third source electrode 173c, and includes a wide expansion 177.

A first passivation layer 180p is formed on the data conductors 171, 173c, 175a, 175b, and 175c and the exposed semiconductors 154a, 154b, and 154c. The first passivation layer 180p may include an inorganic insulating layer made of a silicon nitride, a silicon oxide, or the like. The first passivation layer 180p may prevent a pigment of a color filter 230 from flowing into the exposed semiconductors 154a, 154b, and 154c.

The color filter 230 is formed on the first passivation layer 180p. The color filter 230 extends in a vertical direction along two data lines which are adjacent to each other. A first light blocking member 220 is disposed on the first passivation layer 180p, the edge of the color filter 230, and the data line 171.

The first light blocking member 220 extends along the data line 171 and is disposed between two adjacent color filters 230. The first light blocking member 220 may be wider than the data line 171. As such, because the width of the first light blocking member 220 is formed to be larger than that of the data line 171, the first light blocking member 220 may prevent light incident from the outside from reflecting from a surface of the data line 171 which is made of a metal. Therefore, the light reflected from the surface of the data line 171 does not interfere with the light transmitting through the liquid crystal layer 3, and as a result, prevents a contrast ratio of the liquid crystal display from deteriorating.

A second passivation layer 180q is formed on the color filter 220 and the first light blocking member 230.

The second passivation layer 180q may include an inorganic insulating layer made of a silicon nitride, a silicon oxide, or the like. The second passivation layer 180q prevents the color filter 230 from lifting and suppresses pollution of the liquid crystal layer 3 due to organic materials such as a solvent inflowing from the color filter 230, thereby preventing defects from occurring, such as an afterimage which may occur at the time of driving the screen.

A first contact hole 185a and a second contact hole 185b, which expose the first drain electrode 175a and the second drain electrode 175b, are formed in the first passivation layer 180p and the second passivation layer 180q.

A third contact hole 185c, which exposes a portion of the reference electrode 137 and a portion of the third drain electrode 175c, is formed in the first passivation layer 180p and the second passivation layer 180q. The gate insulating layer 140, in which the third contact hole 185c is formed, is covered with a connection member 195. The connection member 195 electrically connects the reference electrode 137 and the third drain electrode 175c which are exposed through the third contact hole 185c.

A plurality of pixel electrodes 191 are formed on the second passivation layer 180q. The pixel electrodes 191 are separated from each other, having the gate line disposed therebetween. Each pixel electrode 191 includes the first subpixel electrode 191a and the second subpixel electrode 191b which are adjacent to each other in a vertical direction based on the gate line 121. The pixel electrode 191 may be formed from a transparent conductive material such as indium tin oxide ("ITO") or indium zinc oxide ("IZO'). The pixel electrode 191 may also be formed from a reflective metal such as aluminum, silver, chromium, or alloys thereof.

The first subpixel electrode 191a and the second subpixel electrode 191b each have a structure of a basic pixel electrode 191 as illustrated in FIG. 6 or at least one variant thereof.

The first subpixel electrode 191a and the second subpixel electrode 191b are physically and electrically connected to the first drain electrode 175a and the second drain electrode 175b through the first and second contact holes 185a and 185b, respectively, and are applied with a data voltage from the first drain electrode 175a and the second drain electrode 175b. In this case, some of the data voltage applied to the second drain electrode 175b is divided by the third source electrode 173c such that a magnitude of the voltage applied to the first subpixel electrode 191a may be larger than that of the voltage applied to the second subpixel electrode 191b.

The first subpixel electrode 191a and the second subpixel electrode 191b to which the data voltage is applied generate an electric field along with the common electrode 270 of the upper display panel 200, thereby determining alignment of liquid crystal molecules of the liquid crystal layer 3 between the two electrodes 191 and 270. The luminance of light passing through the liquid crystal layer 3 along the alignment direction of the liquid crystal molecules determined as described above, is changed.

A second light blocking member 330 is disposed on the pixel electrode 191. The second light blocking member 330 is formed to cover a region in which the first transistor Qa, the second transistor Qb, the third transistor Qc, and the first to third contact holes 185a, 185b, and 185c are disposed, and extends in the same direction as the gate line 121 to overlap a portion of the data line 171. The second light blocking member 330 is disposed to at least partially overlap the two data lines 171 which are disposed at both sides of one pixel region to be able to prevent light from leaking which may occur around the data line 171 and the gate line 121 and prevent light from leaking at a region in which the first transistor Qa, the second transistor Qb, and the third transistor Qc are disposed.

Prior to forming the second light blocking member 330, the first passivation layer 180p, the color filter 230, and the second passivation layer 180q are disposed in the region in which the first transistor Qa, the second transistor Qb, the third transistor Qc, and the first to third contact holes 185a, 185b, and 185c are disposed, thereby easily identifying the positions of the first transistor Qa, the second transistor Qb, the third transistor Qc, and the first to third contact holes 185a, 185b, and 185c.

The first alignment layer 11 is disposed on the second light blocking member 330. As described above, the first alignment layer 11 includes an alignment layer polymer including the diamine compound unit body, and the vertical functional group may include a functional group having rigidity or include a photoreactive group having great anchoring energy, or a diamine unit body may include a plurality of molecules of reactive mesogen. An alignment layer combining all of the above-described features is also allowable, an exemplary embodiment of which is expressed by the formulas in FIG. 2A to FIG. 2D.

The upper panel 200 will now be described.

The common electrode 270 is formed on the insulating substrate 210. A second alignment layer 21 is formed on the common electrode 270. The second alignment layer 21 may be a vertical alignment layer and may include the same material as the first alignment layer 11.

The liquid crystal layer 3 has negative dielectric anisotropy, and the liquid crystal molecules 31 of the liquid crystal layer 3 are aligned so that a major axis thereof is perpendicular to the surfaces of the two display panels 100 and 200 in the state in which no electric field is present.

The basic pixel electrode 191 will be described with reference to FIG. 6.

As shown in FIG. 6, the basic pixel electrode 191 is quadrangular, and includes a cruciform stem part which is configured to include a horizontal stem part 193 and a vertical stem part 192 that is orthogonal thereto. Further, the basic pixel electrode 191 is divided into a first subregion Da, a second subregion Db, a third subregion Dc, and a fourth subregion Dd by the horizontal stem part 193 and the vertical stem part 192, in which each subregion Da to Dd includes a plurality of first minute branch parts 194a, a plurality of second minute branch parts 194b, a plurality of third minute branch parts 194c, and a plurality of fourth minute branch parts 194d.

The first minute branch part 194a obliquely extends to the left and up from the horizontal stem part 193 or the vertical stem part 192, and the second minute branch part 194b obliquely extends to the right and up from the horizontal stem part 193 or the vertical stem part 192. Further, the third minute branch part 194c extends to the left and down from the horizontal stem part 193 or the vertical stem part 192, and the fourth minute branch part 194d obliquely extends to the right and down from the horizontal stem part 193 or the vertical stem part 192.

The first to fourth minute branch parts 194a, 194b, 194c, and 194d form an angle of approximately 45° or 135° with respect to the gate line 121 or the horizontal stem part 193. Further, the minute branch parts 194a, 194b, 194c, and 194d of two neighboring subregions of Da, Db, Dc, and Dd may be orthogonal to each other.

Widths of the minute branch parts 194a, 194b, 194c, and 194d may be about 2.5 micrometer (µm) to about 5.0 µm, and an interval between the adjacent minute branch parts 194a, 194b, 194c, and 194d within one subregion Da, Db, Dc, and Dd may be about 2.5 µm to about 5.0 µm.

According to another exemplary embodiment, the widths of the minute branch parts 194a, 194b, 194c, and 194d may be widened toward the horizontal stem part 193 or the vertical stem part 192, and a difference between a portion having the widest width and a portion having the narrowest width in one of the minute branch parts 194a, 194b, 194c, and 194d may be about 0.2 µm to about 1.5 µm.

The first subpixel electrode 191a and the second subpixel electrode 191b are connected to the first drain electrode 175a or the second drain electrode 175b, respectively, through the first and second contact holes 185a and 186b, and are applied with a data voltage from the first drain electrode 175a and the second drain electrode 175b. In this case, sides of the first to fourth minute branch parts 194a, 194b, 194c, and 194d distort an electrical field to generate a horizontal component which determines an inclined direction of the liquid crystal molecules 31. The horizontal component of the electric field is substantially parallel to the sides of the first to fourth minute branches 194a, 194b, 194c, and 194d. Therefore, as illustrated in FIG. 5, the liquid crystal molecules 31 are inclined in a direction parallel with a length direction of the minute branch parts 194a, 194b, 194c, and 194d. The one pixel electrode 191 includes the four subregions Da, Db, Dc, and Dd in which the length directions of the minute branch parts 194a, 194b, 194c, and 194d are different from each other, and therefore the direction in which the liquid crystal molecules 31 are inclined is approximately four directions and the liquid crystal layer 3 is formed with four domains in which the alignment directions of the liquid crystal molecules 31 are different in the liquid crystal layer 3. As such, when the direction in which the liquid crystal molecules are inclined is various, a reference viewing angle of the liquid crystal display is increased.

An afterimage according to the above-described exemplary may be estimated. In detail, afterimage estimation was performed on the present exemplary embodiment in which the diamine compound unit body includes a plurality of molecules of reactive mesogen (Example 1) and the comparative example in which the diamine compound unit body includes a single molecule of reactive mesogen.

TABLE 1

| Classification | Example 1 | Comparative Example |
|---|---|---|
| Room temperature afterimage | 11.5 | 20 |
| High-temperature afterimage | 10.7 | 16 |
| Instant afterimage | 12 | 20 |
| Afterimage comparison degree | 3 | 4 |

Referring to Table 1, the predetermined image is output for 168 hours at room temperature, it is removed, and the afterimage is estimated. It was found that the afterimage was removed after substantially 20 seconds for the comparative example, while the afterimage was removed after 11.5 seconds Example 1.

Further, when a predetermined image was output for 168 hours at a high temperature of substantially 60 degrees Celsius (° C.), it was removed, and the afterimage was estimated for the same experimental example. The afterimage was removed after substantially 16 seconds for the comparative example, while the afterimage was removed after substantially 10.7 seconds for Example 1.

Also, when the afterimage was estimated in the case in which the gray was changed to substantially an 8-th gray from the minimum or maximum gray in the same experimental example, the afterimage was removed after substantially 20 seconds for the comparative example, and the afterimage was removed after substantially 12 seconds for Example 1.

When the above-noted results were estimated with numerical values according to a predetermined reference, the Example 1 substantially shows Level 3 and the comparative example shows Level 4 that is lower than Level 3.

In summary, the exemplary alignment layer according to the present invention is configured with an organic material including a functional group for increasing rigidity, and the liquid crystal display including the same, has an afterimage which is substantially improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:

a first insulation substrate;

a second insulation substrate facing the first insulation substrate;

a pixel electrode disposed on the first insulation substrate;

a common electrode disposed on the first insulation substrate or the second insulation substrate;

an alignment layer member comprising a first alignment layer disposed on the first insulation substrate and a second alignment layer disposed on the second insulation substrate; and a liquid crystal layer disposed between the first insulation substrate and the second insulation substrate, wherein at least one of the first alignment layer and the second alignment layer comprises an alignment layer polymer comprising a main chain, and a plurality of side chains connected to the main chain, wherein the plurality of side chains comprises a plurality of molecules of reactive mesogen comprising a functional group which increases rigidity of the alignment layer member, wherein the plurality of side chains are connected to a diamine compound body and more than one molecule of reactive mesogen is connected to a single diamine compound unit body.

2. The liquid crystal display of claim 1, wherein the alignment layer polymer comprises polyamic acid or a polyimide.

3. The liquid crystal display of claim 2, wherein the polyamic acid or the polyimide is a copolymer of a dianhydride compound and the diamine compound unit body.

4. The liquid crystal display of claim 3, wherein the reactive mesogen comprises a vertical functional group, and a photoreactive group connected to the vertical functional group.

5. The liquid crystal display of claim 4, wherein the vertical functional group comprises a compound represented by Formula 1:

Formula 1

6. The liquid crystal display of claim 4, wherein the photoreactive group comprises a compound represented by Formula 2:

Formula 2

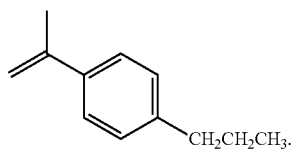

7. The liquid crystal display of claim 4, wherein rigidity of the alignment layer member is increased as a number of side chains in the plurality of side chains is increased.
8. The liquid crystal display of claim 4, wherein the amount of diamine compound unit body comprising the reactive mesogen is less than 60 wt % of a total amount of the diamine compound unit body in the alignment layer polymer.
9. The liquid crystal display of claim 1, wherein the alignment layer polymer is configured to be crosslinked by irradiation with ultraviolet rays.
10. The liquid crystal display of claim 1, wherein the common electrode is disposed on the second insulation substrate, and
the pixel electrode comprises a first subpixel electrode and a second subpixel electrode comprising a cross-shaped stem, and a plurality of minute branches extended from the cross-shaped stem.
11. The liquid crystal display of claim 10, wherein the pixel electrode is divided into four subregions by the cross-shaped stem.
12. The liquid crystal display of claim 11, wherein the minute branches of each subregion are extended in different directions.
13. The liquid crystal display of claim 10, wherein neighboring minute branches are orthogonal to each other.
14. The liquid crystal display of claim 10, wherein a width of the minute branch is about 2.5 μm to about 5.0 μm.
15. The liquid crystal display of claim 3, wherein the diamine compound unit body comprises a compound represented by at least one of Formulas 3 to 6:

Formula 3

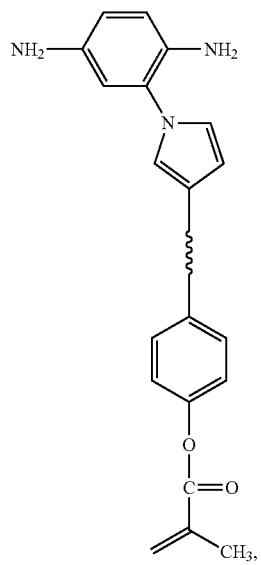

Formula 4

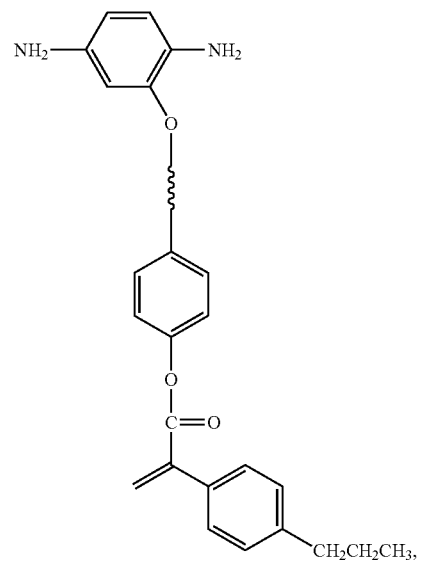

Formula 5

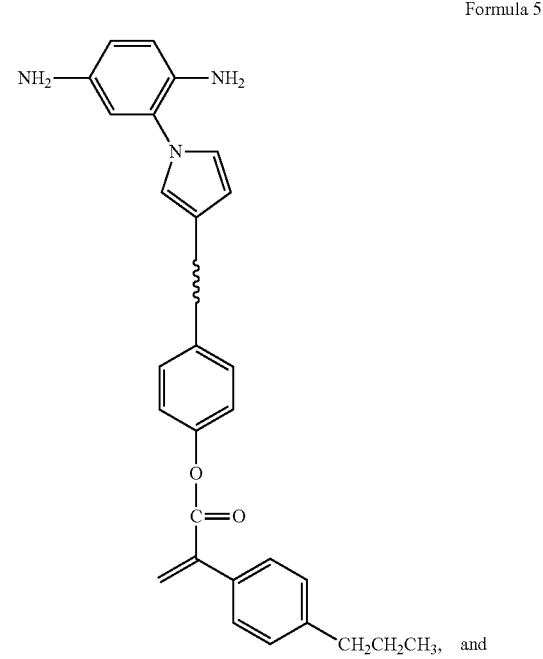

and

-continued

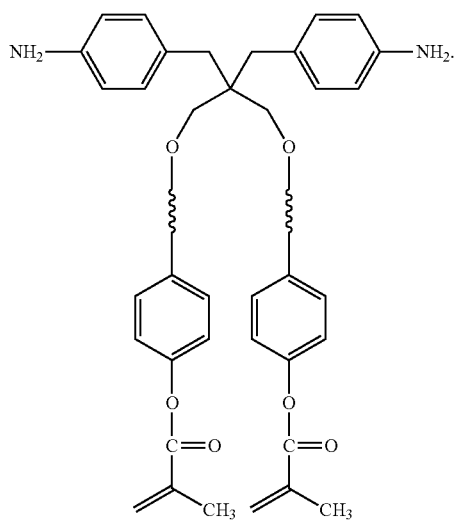

Formula 6

16. A method for manufacturing a liquid crystal display, comprising:
   coating an alignment layer polymer on a first insulation substrate and a second insulation substrate;
   applying a voltage to a pixel electrode disposed on the first insulation substrate and a common electrode disposed on the second insulation substrate; and
   irradiating the alignment layer polymer with ultraviolet rays,
   wherein the alignment layer member comprises a first alignment layer disposed on the first insulation substrate and a second alignment layer disposed on the second insulation substrate; and
      a liquid crystal later disposed between the first insulation substrate and the second insulation substrate,
   wherein at least one of the first alignment layer and the second alignment layer comprises an alignment layer polymer comprising a main chain, and a plurality of side chains connected to the main chain, wherein the plurality of side chains comprises a plurality of molecules of reactive mesogen comprising a functional group which increases a rigidity of the alignment layer member, wherein the plurality of side chains are connected to a diamine compound unit body and more than one molecule of reactive mesogen is connected to a single diamine compound unit body.

17. The method of claim 16, wherein
the irradiation of ultraviolet rays is an electric field process or a non-electric field process.

18. The method of claim 17, wherein
the irradiation of ultraviolet rays is the electric field process, and a voltage of about 3 V to 60 V is applied.

* * * * *